United States Patent [19]
Takahashi

[11] Patent Number: 5,447,768
[45] Date of Patent: Sep. 5, 1995

[54] OPTICAL DISK WITH A BEARING RING

[75] Inventor: Kenji Takahashi, Miyagi, Japan

[73] Assignee: Sony Corporation, Tokyo, Japan

[21] Appl. No.: 875,337

[22] Filed: Apr. 29, 1992

[30] Foreign Application Priority Data

Apr. 30, 1991 [JP] Japan .................. 3-126911

[51] Int. Cl.⁶ .................. G11B 5/016; G11B 23/02
[52] U.S. Cl. .................. 428/66.6; 384/909; 369/290; 360/135
[58] Field of Search .......... 384/908, 909; 428/65, 428/516; 369/290; 360/135

[56] References Cited

U.S. PATENT DOCUMENTS

| | | | |
|---|---|---|---|
| 2,951,721 | 9/1960 | Asp | 428/65 |
| 4,331,367 | 5/1982 | Trudeau et al. | 384/202 |
| 4,660,119 | 4/1987 | Kato et al. | 360/135 |

FOREIGN PATENT DOCUMENTS

| | | |
|---|---|---|
| 0327050 | 8/1989 | European Pat. Off. . |
| 0356811 | 3/1990 | European Pat. Off. . |
| 0373763 | 6/1990 | European Pat. Off. . |
| 0404333 | 12/1990 | European Pat. Off. . |

*Primary Examiner*—Alexander S. Thomas
*Attorney, Agent, or Firm*—Hill, Steadman & Simpson

[57] ABSTRACT

A bearing ring for an optical disk has sufficiently high firmness and satisfactory sliding properties. The ring is formed by cutting a laminate structure comprising a first layer formed of a firm film of material having a sufficiently high modulus of rigidity and a second layer formed of a film having a very low coefficient of sliding friction. The first layer is preferably a film of polyethylene terephthalate and the second layer is preferably a polyethylene having a very high molecular weight of one million or more. The second layer can also be formed of nylon 6, 6, polyacetal and fluorocarbon resins.

2 Claims, 2 Drawing Sheets

OPTICAL DISK WITH A BEARING RING

BACKGROUND OF THE INVENTION

1. Field of the Invention

The present invention relates to a bearing ring with a low sliding friction for an optical disk which is held for rotation in a cartridge.

2. Description of the Prior Art

Optical disks on which information is recorded and from which information is reproduced with a laser beam have been widely used. These disks include digital audio disks, i.e., so-called compact disks, and optical video disks for recording video signals and audio signals, i.e., so-called laser disks. Because optical disks have capabilities for storing enormous quantities of information and for facilitating information retrieval, they are used for external memories for computers. Magneto-optical disks, writable optical disks and erasable optical disks have been developed for use in information management.

The magneto-optical disk, which is expected to be used as a storage device for a computer, is among those optical disks which, in particular, must ensure high recording and reproducing reliability. To prevent the surface of the optical disk from being damaged and becoming dusty during storage of the optical disk and to prevent the surface of the optical disk from being stained with finger prints and the like during loading of the optical disk on a disk drive, the optical disk is mounted for rotation in a disk cartridge which is made of plastic.

In such a disk cartridge, the cartridge is provided with disk supporting ribs protruding from an inner surface at positions corresponding to the central non-recording area of the optical disk. To prevent damaging the recording area of the optical disk by frictional contact between the recording area of the optical disk and the inner surface of the cartridge, the optical disk is held between the disk supporting ribs so that the recording area of the optical disk will not be in contact with the inner surface of the cartridge. If the optical disk is in direct contact with the disk supporting rib or ribs, the optical disk and the disk supporting rib or ribs will chafe each other to produce dust when the optical disk is rotated. It is, thus, possible that this dust will adversely affect the reliability of the recording and reproducing performance of the optical disk. Therefore, a slippery bearing ring formed by cutting a PET (polyethylene terephthalate) film is interposed between each disk supporting rib and the corresponding portion of the optical disk to prevent the direct frictional contact between the disk supporting ribs and the optical disk. However, the sliding performance of this bearing ring formed by cutting a PET film is not necessarily fully satisfactory and, under severe operating conditions, in particular, the surface of the bearing rings may be abraded to produce dust.

A bearing ring capable of improved sliding performance formed by cutting a film of polyethylene having a very high molecular weight has been tested. The slippery sliding or bearing ring formed of the polyethylene having a very high molecular weight is difficult to handle, due to a lack of firmness, and, hence, it is difficult to correctly apply the bearing ring in place on the optical disk and the bearing ring is liable to deviate from the correct position.

SUMMARY OF THE INVENTION

Accordingly, it is an object of the present invention to provide a bearing ring or slippery sliding ring for an optical disk, which ring is capable of sliding satisfactorily relative to the disk support ribs of a cartridge, has a sufficiently high firmness and facilitates the application of the bearing ring to the optical disk.

A bearing ring for an optical disk in one aspect of the present invention comprises a firm first layer, which is placed in contact with the optical disk and is formed of a material having a high modulus of rigidity, and a slippery second layer, which is formed of a slippery material having satisfactory sliding properties, such as a very low coefficient of sliding friction.

A slippery sliding or bearing ring for an optical disk must have a high bending rigidity to facilitate the application of the ring to an optical disk, in addition to satisfactory sliding properties. The conventional bearing ring formed by cutting a PET film having a relatively high bending rigidity produces a bearing ring which can easily be applied to the optical disk. However, the sliding performance of this conventional bearing ring is not satisfactory. On the other hand, the bearing ring formed by cutting a film of polyethylene having a very high molecular weight has excellent sliding properties, however, its low bending rigidity requires a very difficult process for applying the bearing ring to the optical disk. Thus, neither the bearing ring formed of PET nor the bearing ring formed of a polyethylene having a very high molecular weight have satisfactory qualities to meet required sliding performance and to facilitate the application of the bearing ring to the optical disk.

Accordingly, the present invention provides a bearing ring comprising a firm first layer for facilitating the application of the ring to an optical disk and a slippery second layer for securing satisfactory sliding performance.

Desirably, the second layer is formed of a slippery material having a coefficient of kinetic friction without any lubrication relative to the cartridge of 0.40 or below and a taper abrasion of 250 (JIS D1175, mg/1000 times). Suitable materials for forming the second layer are a polyethylene having a molecular weight of one million or above; nylon 6, 6, polyacetal and fluorocarbon resins. A polyethylene which has a very high molecular weight is particularly suitable for forming the second layer owing to its excellent abrasion resistance, excellent impact resistance and excellent self-lubricating properties. Polyethylenes, which have a very high molecular weight, are available in the market and examples of these are sold under the following trademarks by companies: HIZEX MILLION® (MITSUI KAGAKU KOGYO K.K.), HOSTALEN GUR® (Hoechst Co.) and FIFAX 1900® (Hercules Co.).

Preferably, the first layer is formed of a material having a high modulus of rigidity (JIS D0790) of 70,000 kg/cm$^2$ or above. An example of such a material is polyethylene terephthalate (PET).

Thus, a bearing ring of the present invention for an optical disk has a two-layer construction having sufficiently high firmness and consists of a first layer formed of a material having a high bending rigidity and a second layer formed of a highly slippery material with a low coefficient of sliding friction. Accordingly, the bearing ring can easily be applied to the optical disk, the bearing ring slips smoothly relative to the cartridge and the bearing ring is not abraded to produced dust, even if the optical disk is operated under severe conditions. Thus, the bearing ring ensures maintaining satisfactory recording and reproducing characteristics for the optical disk.

Other advantages and features of the invention will be readily apparent from the following description of the preferred embodiments, the drawings and claims.

DESCRIPTION OF THE PREFERRED EMBODIMENTS

Figure 4:
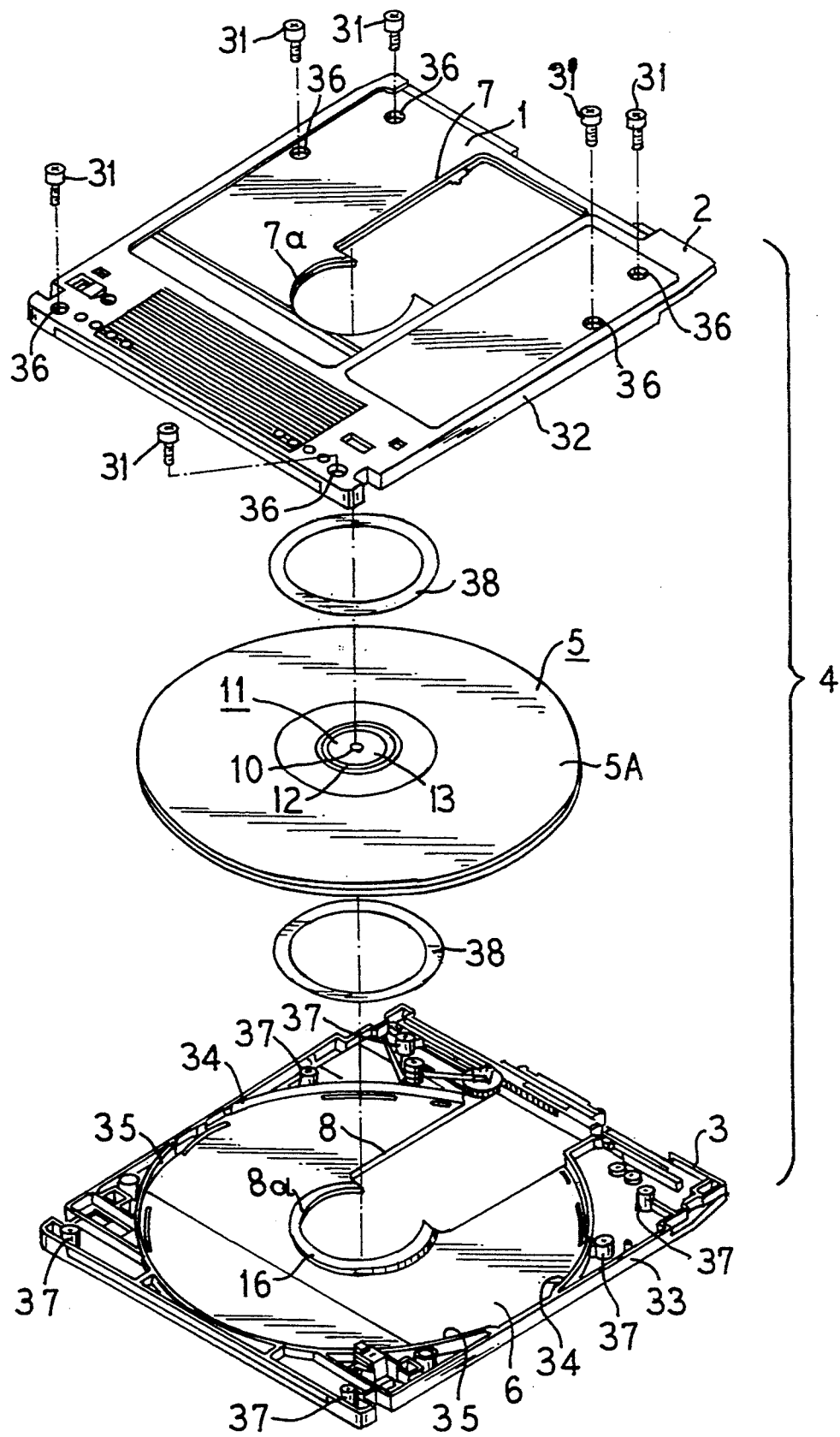
FIG. 4 is an exploded perspective view of an optical disk cartridge employing the bearing rings of the present invention.

The principles of the present invention are particularly useful when incorporated in bearing rings for an optical disk or magneto-optical disk received in a disk cartridge 4, such as illustrated in FIG. 4.

The cartridge 4 is constructed by joining together a substantially square upper half case 2 and a substantially square lower half case 3 so as to form a space for containing a disk 5, such as a magneto-optical disk. The upper half case 2 is fastened on the lower half case 3 by a plurality of screws 31 extending through openings 36 in the upper half 2 and received in the bores in the peripheral projection 37 of the lower half 3. The disk 5 is held for rotation in the space formed in the cartridge 4. The upper half case 2 and the lower half case 3 have peripheral walls, such as 32 and 33, respectively, which form the side walls of the cartridge 4. The lower half case 3 is also provided on its inner surface with a plurality of circular positioning ribs 34 and 35 which extend on a circle of a diameter slightly greater than the outside diameter of the disk 5 to form a disk pocket 6 for holding the disk in place with respect to horizontal directions within the cartridge 4.

The upper half case 2 has a rectangular opening 7 with a round inner portion 7a and the lower half case 3 has a similar rectangular opening 8 with a round inner portion 8a. The openings 7 and 8, with their round portions, extend from the central portion to one edge of the cartridge 4. The portion of the surface of the disk 5 extending from the central portion to the periphery of the disk 5 is, thus, exposed to information read/write means, such as an optical pickup through the openings 7 and 8, respectively. The information read/write means travels radially along the openings 7 and 8 to scan the disk 5. The disk table of the disk drive of the recording/reproducing apparatus for rotating a disk enters the interior of the cartridge through the round portion 8a of the opening 8 to support the disk 5.

Circular disk supporting ribs 16, which support the disk 5 contained in the cartridge 4, are formed along the periphery of the round portions 8a on the inner surface of the lower case 3, and also around the round portion 7a of the upper case 2. The circular disk supporting ribs 16 correspond to the central non-recording area of the disk 5. The circular disk supporting ribs 16 have a circular shape surrounding the round portions 7a and 8a, respectively. The round disk supporting ribs 16 have a thickness sufficient to support the disk securely.

A disk cartridge is completed by placing the disk 5 coaxially provided with slippery bearing rings 38, respectively, on opposite surfaces thereof in the disk pocket 6, which is defined by the circular ribs or walls 34 and 35, with the non-recording area thereof held rotatably between the disk support ribs 16 of the upper half 2 and the lower half 3. The upper case 2 and the lower half case 3 are fastened together by the screws 31 extending through the holes, such as 36, and received in protrusions 37 formed in the periphery of the lower case 3 to complete the formation of the cartridge.

The disk 5, which is contained in the cartridge 4, is a double-sided disk formed by joining together two plates, each consisting of a base plate 5A formed of a polycarbonate resin, a recording layer for recording information formed on the surface of the base plate 5A, an aluminum reflecting film or layer formed over the recording layer, and a protective film of a synthetic resin formed over the aluminum-reflecting layer. The disk 5 is provided with hubs 11, which have a center hole 10 for receiving a center spindle of a disk drive. The hubs 11 are attached coaxially to the major surfaces of the base plates 5A. Each hub 11 is formed by attaching a magnetic plate 13 to a disk formed of a synthetic resin.

The slippery sliding rings or bearing rings 38 are attached coaxially to the major surfaces of the disk 5 so as to surround the hubs 11 and to cover the nonrecording areas in the major surface of the disk, which corresponds to the circular disk supporting ribs 16 formed around the circular portions 7a and 8a of the openings 7 and 8 in the cartridge 4.

Each of the bearing rings 38 comprises a first layer formed by cutting a PET film having a high bending rigidity and a second layer formed by cutting a slippery film of polyethylene having a very high molecular weight that is joined adhesively to the first layer with an acrylic adhesive. The sliding or bearing ring 38 is attached to the disk 5 with a first layer bonded to the disk 5. The first layer formed of PET having a high bending rigidity facilitates handling the bearing ring 38 and correctly attaching the ring 38 to the disk 5. The second layer formed of the slippery polyethylene having a very high molecular weight comes into sliding contact with the circular disk support 16 to enable the disk 5 to slide smoothly relative to the circular supporting ribs 16 when the disk 5 is driven for rotation. Since the friction between the bearing ring 38 and the circular disk support 16 is very small, the disk 38 is not abraded significantly and dust will not be produced. Therefore, errors in writing and reading of the information are reduced.

The method for making the slippery sliding or bearing rings 38 is described hereinafter by way of an example.

Figure 1:
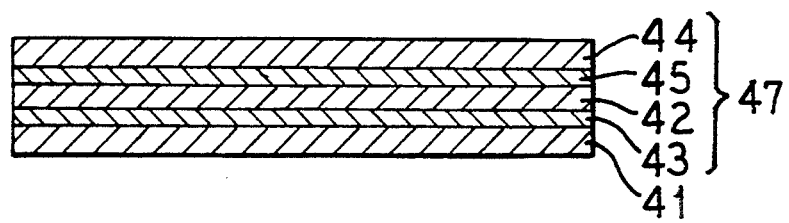
FIG. 1 is a cross sectional view assisting in explaining the method of manufacturing the bearing ring of the preferred embodiment in accordance with the present invention.
Figure 2:
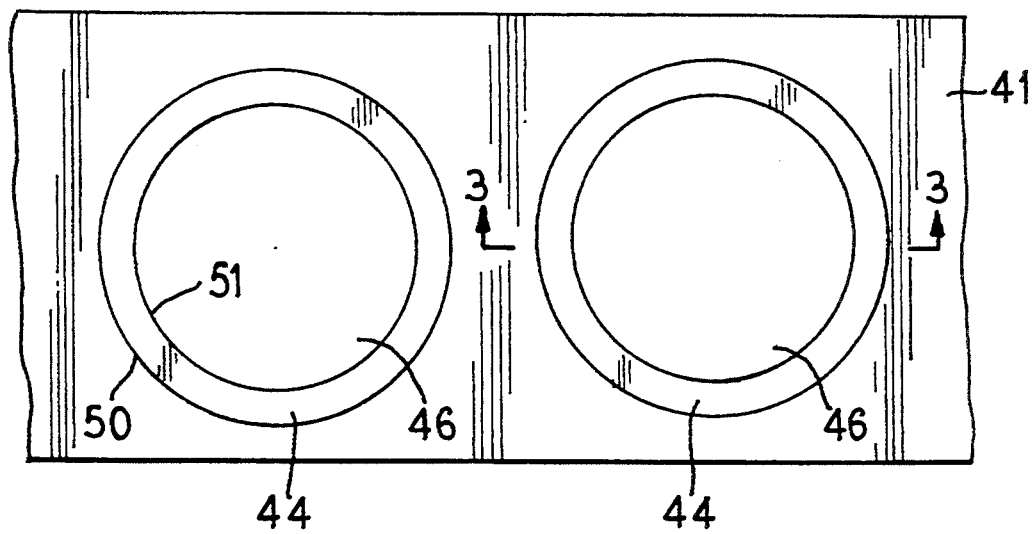
FIG. 2 is a plan view of the bearing ring during manufacture in accordance with the present invention.
Figure 3:
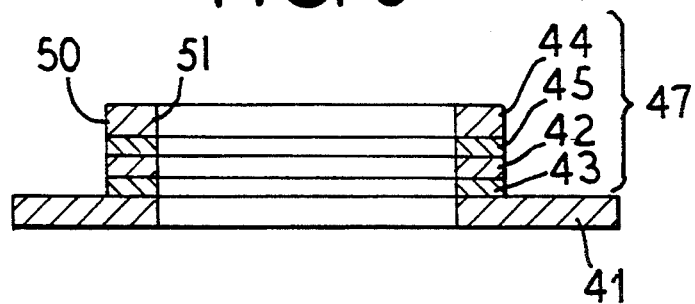
FIG. 3 is a cross sectional view taken along the lines III—III of FIG. 2.

Referring to FIG. 1, a laminate structure 47 is formed on a backing sheet 41 by spreading an adhesive layer 43 over the backing sheet 41. A PET film 42 for forming the first layer is then spread over the adhesive layer 43. Then, a second adhesive layer 45 is spread over the PET film 42 and, finally, a film 44 of polyethylene having a very high molecular weight is applied or spread over the adhesive layer 45. After the adhesive layers 43 and 45 have solidified, concentric, circular incisions having a diameter equal to the outer diameter 50 and inner diameter 51 of the bearing ring 38 and a depth equal to the thickness of the laminate structure 47 are cut into the laminate structure 47, as shown in FIG. 2, with the depth of the incisions being such that the backing sheet 41 is not cut. Portions of the laminate structure 47, other than a portion enclosed therebetween the two circular incisions, are removed from the backing sheet 41. Then, a central circular portion 46 of the laminate structure 47, which portion 46 has a diameter equal to the inside diameter of the ring 48, is cut out together with the corresponding portion of the backing sheet 41, as illustrated in FIG. 3, to form a plurality of rings 38 on the backing sheet 41. The adhesive layers 43 and 45 may be those of a known pressure-sensitive adhesive, such as an acrylic adhesive. Next, the rings 38 are removed from the backing sheet 41 and applied onto the disk with the desired pressure to form the attachment.

Although various minor modifications may be suggested by those versed in the art, it should be understood that I wish to embody within the scope of the patent granted hereon all such modifications as reasonably and properly come within the scope of my contribution to the art.

I claim:

1. An optical disk in combination with a cartridge, said disk having a slippery sliding ring being attached on a major surface of said disk, said slippery sliding ring comprising a first layer bonded to said optical disk and a second layer bonded to said first layer, said first layer being formed of a material having a modulus of rigidity of not less than 70,000 kg/cm$^2$, said second layer being formed of a slippery material having a coefficient of kinetic friction relative to said cartridge of not more than 0.40.

2. An optical disk in combination with a cartridge, said disk having a slippery sliding ring being attached on a major surface of the disk, said slippery sliding ring comprising a first layer bonded to said optical disk and a second layer bonded to said first layer, said first layer is made of a polyethylene terephthalate, said second layer is made of a polyethylene having a molecular weight of not less than one million.

* * * * *